US008335981B2

(12) United States Patent
Naibo et al.

(10) Patent No.: US 8,335,981 B2
(45) Date of Patent: Dec. 18, 2012

(54) METADATA CREATION

(75) Inventors: Alexis Naibo, Levallois-Perret (FR); Philippe Meiniel, Maule (FR)

(73) Assignee: Business Objects Software Ltd., Dublin (IE)

( * ) Notice: Subject to any disclaimer, the term of this patent is extended or adjusted under 35 U.S.C. 154(b) by 665 days.

(21) Appl. No.: 12/534,630

(22) Filed: Aug. 3, 2009

(65) Prior Publication Data

US 2011/0029852 A1 Feb. 3, 2011

(51) Int. Cl.
*G06N 3/00* (2006.01)
(52) U.S. Cl. ........................................................ 715/212
(58) Field of Classification Search ................ 715/212, 715/213, 214, 215, 216, 217, 218, 219, 220
See application file for complete search history.

(56) References Cited

U.S. PATENT DOCUMENTS

| | | | |
|---|---|---|---|
| 6,628,832 B2 | 9/2003 | Kanatsu | |
| 7,739,587 B2 | 6/2010 | Vion-Dury | |
| 8,112,459 B2 | 2/2012 | Dettinger et al. | |
| 2002/0174143 A1* | 11/2002 | Taboada et al. | 707/509 |
| 2007/0140565 A1* | 6/2007 | Lin et al. | 382/203 |
| 2008/0016041 A1* | 1/2008 | Frost et al. | 707/3 |
| 2008/0027908 A1* | 1/2008 | Durbeck et al. | 707/2 |
| 2008/0168036 A1* | 7/2008 | Young et al. | 707/3 |
| 2008/0256432 A1* | 10/2008 | Sambandam et al. | 715/212 |
| 2008/0294679 A1 | 11/2008 | Gatterbauer et al. | |
| 2009/0044095 A1* | 2/2009 | Berger et al. | 715/226 |
| 2010/0049746 A1* | 2/2010 | Aebig et al. | 707/200 |
| 2010/0050264 A1* | 2/2010 | Aebig et al. | 726/25 |
| 2011/0029580 A1* | 2/2011 | Popovski et al. | 707/812 |
| 2011/0295904 A1 | 12/2011 | Mohan et al. | |

OTHER PUBLICATIONS

"U.S. Appl. No. 12/788,792, Non Final Office Action mailed Apr. 24, 2012", 14 pgs.
Gatterbauer, Wolfgang, et al., "Table Extraction using Spatial Reasoning on the CSS2 Visual Box Model", AAAI, (2006), 6 pgs.
Hu, Jianying, et al., "Why Table Ground-Truthing is Hard", IEEE, (2001), 5 pgs.
Kieninger, Thomas G, et al., "T-Recs Table Recognition and Validation Approach", AAAI Technical Report FS-99-04, (1999), 8 pgs.
Kieninger, Thomas G, "Table Structure Recognition Based on Robust Block Segmentation", SPIE vol. 3305, (Apr. 1998), 11 pgs.
Zanibbi, Richard, et al., "A Survey of Table Recognition: Models, Observations, Transformations, and Inferences", 7 IJDAR, (2004), 16 pgs.
Zuyev, Konstantin, "Table Image Segmentation", IEEE, (1997), 4 pgs.

* cited by examiner

*Primary Examiner* — Kyle Stork
(74) *Attorney, Agent, or Firm* — Schwegman Lundberg Woessner P.A.

(57) ABSTRACT

Apparatus, systems, and methods may operate to receive, sequentially, individual lines of information included in a file stored in an electronic storage medium; to locate one or more tables in a spreadsheet when at least two of the lines in a sequence are consecutive lines that begin with a non-empty cell and have a matching length; to determine a vertical orientation or a horizontal orientation of the tables based on an arrangement of the information within the lines and across the lines; and to create metadata from the information, based on the arrangement. The metadata may comprise object label names, object qualifications, and/or object data types. Additional apparatus, systems, and methods are disclosed.

20 Claims, 5 Drawing Sheets

METADATA CREATION

COPYRIGHT

A portion of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data described below and in the drawings and appendices that form a part of this document: Copyright 2009 Business Objects Software Ltd. of Ireland, All Rights Reserved.

BACKGROUND

It is sometimes useful to load spreadsheets and other database files into business assessment and reporting software applications. When this occurs, the end-user is often left to define most, if not all of the metadata contained in the spreadsheet, such as whether a particular column represents a dimension, or a measure, etc. The defined metadata can then serve as a basis for data exploration, as well as producing reports and other documents. However, defining the metadata for a large spreadsheet can be tedious, and subject to human error.

BRIEF DESCRIPTION OF THE DRAWINGS

Some embodiments are illustrated by way of example and not limitation in the figures of the accompanying drawings, in which.

DETAILED DESCRIPTION

To address the challenge of creating metadata for spreadsheets and other data files, such as determining table orientation, column types, names, and qualification (e.g., dimension/measure) as well as functional dependencies, various embodiments of the invention operate to detect tables within a data file, determine the table orientation, qualify the data in the rows and columns, and then create metadata comprising object label names, object qualifications, and object data types.

The metadata created by various embodiments can be processed by business intelligence (BI) applications, including the SAP® BusinessObjects™ Explorer analysis tool, to allow users to enter keyword searches against data stores and receive results back in the form of reports, dashboards, and visualizations. BI applications can also use the metadata to make calculations and build reports. By implementing various embodiments, metadata in a spreadsheet or other data file can be created automatically, so that end-users will have less work to do when reports are generated. Laboratory testing indicates that approximately 80% of the metadata used by BI applications can be generated according to the mechanisms described herein, removing the larger part of a burden formerly imposed on the end-user.

Many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments. For the purposes of this document, several terms will now be defined.

A "dimension" or "dimension object" comprises any characteristic that is used to specify the members of a data set. Most dimensions have hierarchies. Dimension objects typically retrieve character-type data (customer names, resort names, etc.), or dates (years, quarters, reservation dates, etc.) that form the basis for analysis in a report, although they are not limited to these types of data. Examples of dimensions include time, geography, product, service, price, or customer.

A "detail" or "detail object" provides descriptive data about a dimension object (or some attribute of a dimension). The detail is usually associated with a specific dimension object. A detail is not normally used in drill down analyses. Examples of details include the address and phone number associated with a customer dimension.

A "functional" dependency is a constraint between two sets of related attributes in a database. Thus, given a relationship R, a set of attributes X in R is said to functionally determine another attribute Y, also in R, (written X→Y) if and only if each X value is associated with exactly one Y value. X may be called the determinant set, and Y may be called the dependent attribute. An example of a functional dependency is a one-way dependency relationship between a first dimension and a second dimension within a table in a spreadsheet that holds true for all of the information in that table.

A "measure" or "measure object" is generated from existing data using a mathematical operation or a data transformation, such as an aggregation function. Examples include the following: count, sum, minimum, maximum, or average. Thus, a measure may comprise a set of numeric data items to which one or more of these functions has been applied. This type of object often provides statistical information. Examples of measures include revenue, unit price, average profit, etc.

An "object label name" is a character label used to symbolically describe the true meaning of a data element or object.

An "object qualification" defines the measure with the correct aggregation type for an object or data item.

An "object data type" defines the type of data for each data element in a spreadsheet. Example of object data types include: numeric, text, and date, among others. Designating object data types enables the application of aggregation and other mathematical operations to the data.

Various embodiments of the invention operate to read spreadsheets and other data files, including Microsoft® Excel™ spreadsheets. The information received is then analyzed to detect the existence of tables and their orientation (rows and columns), and then to create metadata, such as object label names, object qualifications, object data types, and perhaps hierarchies, including functional dependencies.

Figure 1:
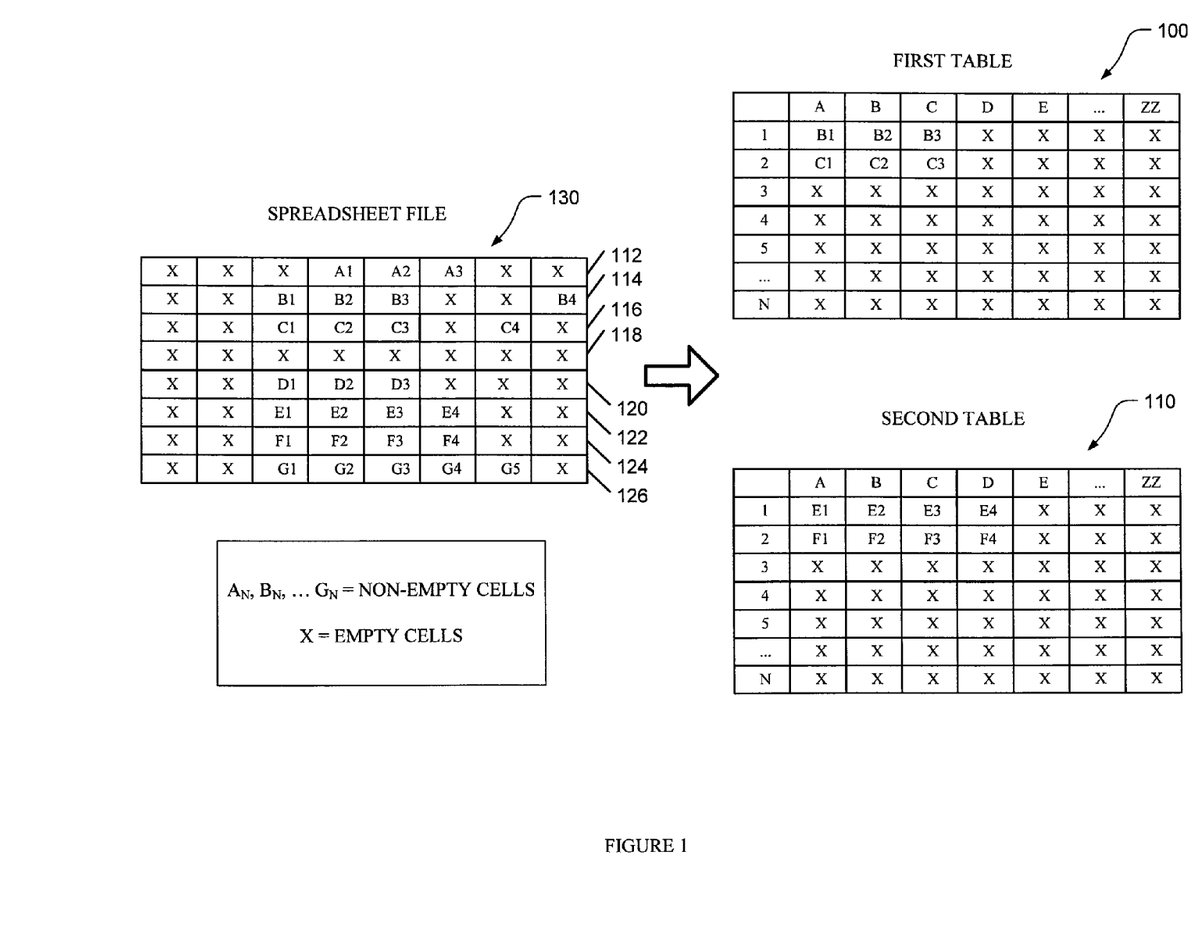
FIG. 1 illustrates detection of tables 100 and 110, according to various embodiments of the invention.

FIG. 1 illustrates detection of tables 100 and 110, according to various embodiments of the invention. Here it can be seen that lines of information 112-126 are read in or received, sequentially, as individual lines of information forming part of a file 130, such as a spreadsheet file. To detect the existence of first and second tables 100, 110 within the information stored in the file 130, the individual data elements and their locations in each line are compared with subsequent lines to find lines in a sequence (one directly following another) that have the same length of matching, non-empty content. For example, in the file 130, it can be seen that lines 114 and 116 each include the non-empty cells of information B1 . . . B3 and C1 . . . C3. They are the same length, and they also "match", because the non-empty data are in the same relative location in the sequential lines 114, 116. Thus, they form the basis of the first table 100.

Similarly, in the file 130, it can be seen that lines 122 and 124 each include the non-empty cells of information E1 . . . E4 and F1 . . . F4. They are the same length, and they match according to the occupation of the same relative location in sequential lines 122, 124. Therefore, they can be used to form the basis of the second table 110.

The non-empty cells A1 . . . A3 in line 112 are not included in a table because, although they are the same length as the lines 114, 116, they do not match. That is, the same length does not occur in the same positions along the sequential lines of information 112, 114. Similarly, although the non-empty cells G1 . . . G5 include matching cells within the sequential lines 122, 124, 126, they are not the same length, because of the extra cell G5.

Thus, various embodiments may operate to detect one or more tables in a spreadsheet by receiving individual, sequential lines of information and pruning a decision tree (narrowing the available choices) based on defined extraction rules. For example, two blank columns may be used to separate one table area from another. The table detection algorithm can be reset between areas. In this way, tables can be detected quickly, and perhaps, the proposed arrangement of tables can be presented to an end-user for final judgment.

Figure 2:
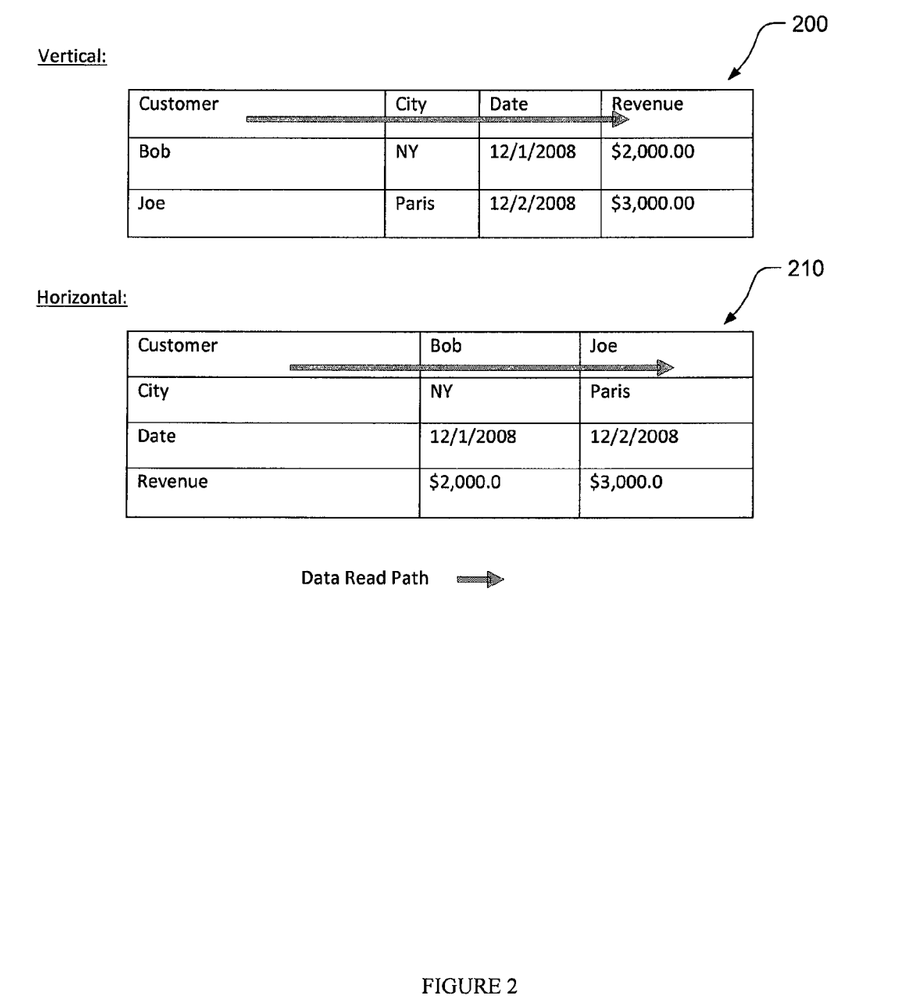
FIG. 2 illustrates table orientation determination according to various embodiments of the invention.

FIG. 2 illustrates table orientation determination according to various embodiments of the invention. In FIG. 2, it can be seen that the possible orientations for a table include a vertical orientation, as shown for table 200, and horizontal orientation, as shown for table 210. In some embodiments, the orientation determination algorithm operates using a single pass on a stream of file data, comprising many sequential lines of information. The algorithm may operate to find the table direction in one pass based on element data type changes as the elements of the table are traversed and parsed. In many instances, the first row or column of data may not be data specific—instead, it may comprise row/column titles.

Determining the direction of the table may be based on a decision tree. First, the possibilities (vertical with text and date data types, horizontal with integer or double precision numeric data types, etc.) are noted as proposals, and then the proposals are modified and/or validated as additional information is received. During the modification/validation activities, which occur as new lines of information are received, the tree can be pruned (e.g., before reading a line, there may be four possibilities, and afterward, only have two possibilities remain). Alternatively, or in addition, decision branch attributes can be updated/changed (e.g., before reading a line, a column data type is set to double precision numeric, and afterward, it is set to string).

At the end of this phase, the vertical and horizontal position of the table, as well as the column titles and column data types are defined. In some embodiments, at the end of the parsing/assignment activity, if there are decision branches left in the tree, the end-user may be permitted to define some portion of the resulting metadata. In some embodiments, at various points in the activity, the end-user may be shown the latest decision tree adjustment to request approval or changes. For example, if the title row does not match the length of subsequent rows, it can be designated as such, subject to end-user approval.

In this way, object level names can be assigned, and set to the table header name (e.g., column or line). It is possible that no name is discovered for a set of objects. Thus, if none is apparent, default object data type "names" can be assigned, such as "Dimension 1" or "Measure 2".

Object data types can be assigned on a column by column basis, perhaps based on the table cell data types in each column. Some database files (e.g., Excel™ spreadsheets) can provide a set of cell data types that are then mapped to object data types (e.g., text, date, currency, Boolean, and numeric).

Object qualification may include defining whether an object is a dimension, measure, or detail to facilitate data exploration and reporting. In some embodiments, object qualification can be based on determining detail, perhaps as 1:1 relationships between the columns that are defined in a table that has been located. For example, there may be a 1:1 relationship between names and identification numbers, such that the identification numbers are details of the names.

The algorithms used to determine object qualification can operate along the same general lines as those that detect table direction. Thus, decision trees can be trimmed so that incorrect data types are removed, and at the end of the process, only a small number of solutions (e.g., a single solution) remain.

For example, by default, all columns in a located table can be set to dimensions (e.g., any one of String, Date, or Numeric data types). The column qualification can be revised to detail when there is another column that has a 1:1 relationship with it. Thus, details are dimensions (not measures) that have a 1:1 relationship.

Table columns or rows that are detected as dimensions can have functional dependencies. However, the value associated with every functional dependency should be unique. If there is symmetry between two dimensions (dim 1=>dim2 and dim2=>dim 1), one of the dimensions can be defined as a detail of the other. A heuristic may be used to define that the left-most column of two related columns will be the dimension, and the other column will be the detail. Another indication of a dimension, and not a measure, would be data that has a perfect distribution of the same type over a long interval of values.

Columns can be set to the measure type automatically with the following heuristic: set to the measure type when the column data includes a double precision specification and/or includes periods, or commas. Integer types may comprise a measure if all the values fall within a prescribed range, such as between [1900 . . . 2050] (year) or [1 . . . 31] (day) or [1 . . . 12] (month) or [1 . . . 52] week. A measure may also be indicated if the data values constitute currency symbols, negative values, or an aggregation function. Both measures and dimensions can be determined according to a decision tree algorithm, if desired.

Additional rules can be developed. For example, when integer values are set to a dimension, they may be reset to a measure if they are positioned after other objects defined as a measure, or if they are positioned at the end of the table (e.g., the end of a table often comprises the right-hand-most column of the table when the language used reads left-to-right).

Functional dependencies may be detected and hierarchies within the data may be determined, perhaps using a decision tree and cardinality between rows and columns. For example, at the beginning of a functional dependency determination algorithm, functional dependencies can be created between every row or column within a table. For each cell that is classified as a dimension, all adjacent lines are stored as possible functional dependencies. These functional dependency classifications are removed (pruned) if a line is detected as a measure—then all adjacent lines lose their functional dependency on that line. In addition, for every line that is read/received, the values in the line and the links to adjacent lines are retained. However, if a link to an adjacent line value has already been selected, the new links are removed.

For example, consider Table I below:

TABLE I

| Country | City | Revenue |
|---------|------|---------|
| US | NY | $2,000.00 |
| US | NY | $3,000.00 |
| US | Dallas | $3,000.00 |
| France | Paris | $3,000.00 |

The functional dependency links may include: Revenue=>City, Revenue=>Country, City=>Revenue, and Country=>Revenue. These functional dependencies may be removed when Revenue is detected as a measure. Other functional links put in place by default may include: Country=>City (e.g., US has NY, US has NY, and US has Dallas), and City=>Country (NY has US, Dallas has US, and Paris has France). Therefore, the functional dependency of Country=>City is removed, because the logic does not hold, and the functional dependency of City=>Country is retained.

In some embodiments, a minimal number of lines of information are specified for reception before functional dependencies within a given data set are inferred. This minimum number may correspond to 25 or 50 or 100 times the number of dimensions in the data set, for example.

Once functional dependencies have been found, a path between the dependencies can be defined to determine hierarchies. For example, if Dimension1 has a functional dependency on Dimension2, and Dimension2 has a functional dependency on Dimension3, then Dimension1 has a functional dependency on Dimension3. This establishes a functional dependency path of (Dimension1, Dimension2, Dimension3). For example, if there are elements of a Country, State and City in a data set, the following functional dependencies exist: City=>Country; State=>Country; and City=>State. The hierarchy dependency path may be mapped as (City, State, Country). Thus, many embodiments may be realized.

Figure 3:
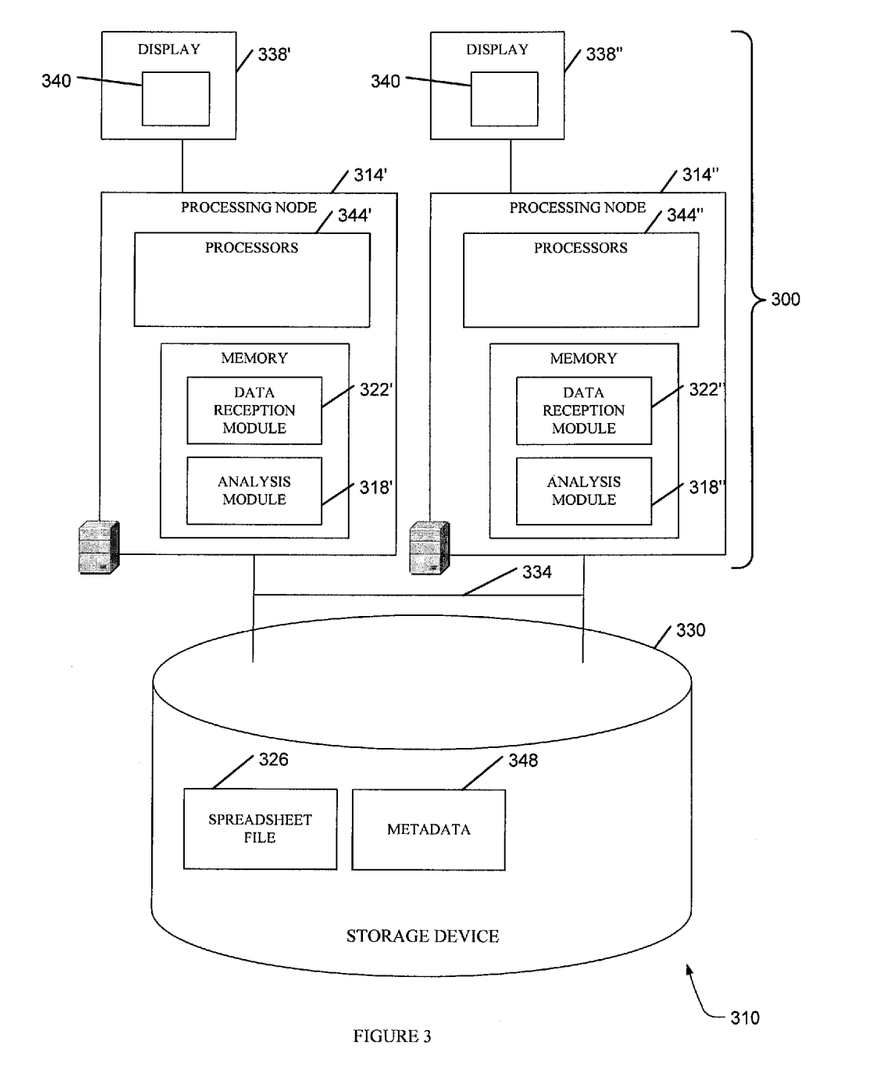
FIG. 3 is a block diagram of apparatus and systems according to various embodiments of the invention.

For example, FIG. 3 is a block diagram of apparatus 300 and systems 310 according to various embodiments of the invention. Thus, in some embodiments, an apparatus 300 to create metadata comprises a processing node 314' and an analysis module 318. The processing node 314' may comprise a data reception module 322' to sequentially receive individual lines of information from a spreadsheet file 326 stored in an electronic storage medium 330.

The analysis module 318 may be directly coupled to the processing node 314' by including it in the same processing node 314' where the receipt of data occurs (e.g., analysis module 318'), or by locating it in another processing node 314" (e.g., analysis module 318"), perhaps indirectly coupled via a storage medium 330, or a network 334. The analysis module 318 operates to locate at least one table in the spreadsheet when at least two of the lines in a sequence have a matching length, and to determine, based on an arrangement of the information within the lines and across the lines, the orientation of the tables that have been located.

The analysis module 318 also operates to create metadata 348 from the information based on the arrangement of the information within the lines and across the lines. The metadata 348 comprises object label names, object qualifications, and/or object data types, among others. The apparatus 300 may take the form of a desktop or laptop computer, a cellular telephone or personal digital assistant (PDA), a server, a client, as well as other devices.

In some embodiments, the apparatus 300 includes a display 338 to display output from the apparatus 300 to an end-user. For example, the metadata 348, newly created by the apparatus 300, may be displayed. Thus, the apparatus 300 may comprise one or more displays 338 to display rows and columns of the spreadsheet file 326 according to the orientation of the tables that have been located, and locations of the data within the information that is received from the file 326, wherein the data is associated with designated object data types.

The apparatus 300 may comprise multiple processors 344. For example, the apparatus 300 may comprise multiple processors 344, such that the processing node 314' comprises a first one of the multiple processors 344', and the analysis module 318' comprises a software module to be executed by a second one of the multiple processors 344'. Additional embodiments may be realized.

For example, a system 310 may comprise multiple processing nodes, such as more than one of the apparatus 300. Thus, a system 310 may comprise a first processing node 314' that includes a data reception module 322' to sequentially receive individual lines of information from a spreadsheet file 326 stored in an electronic storage medium 330, such as a hard disk or flash drive. The system 310 may also comprise a second processing node 314" that includes an analysis module 318" to couple to the first processing node 314', the analysis module 318" operating as described previously.

The nodes of the system 310 may comprise physical nodes, virtual machines, and combinations of these. The system 310 may include multiple servers and clients. Thus, the first processing node may comprise a client node, and the second processing node may comprise a server node, and vice versa.

A display may be coupled to one or more of the nodes in the system 310. For example, the system 310 may comprise one or more displays 338 coupled to the first processing node and/or the second processing node, wherein the display 338 is used to display a query 340. In some embodiments, the query may be used to solicit selection of orientation data indicating whether the determined orientation for one or more tables is correct. Still further embodiments may be realized.

Figure 4:
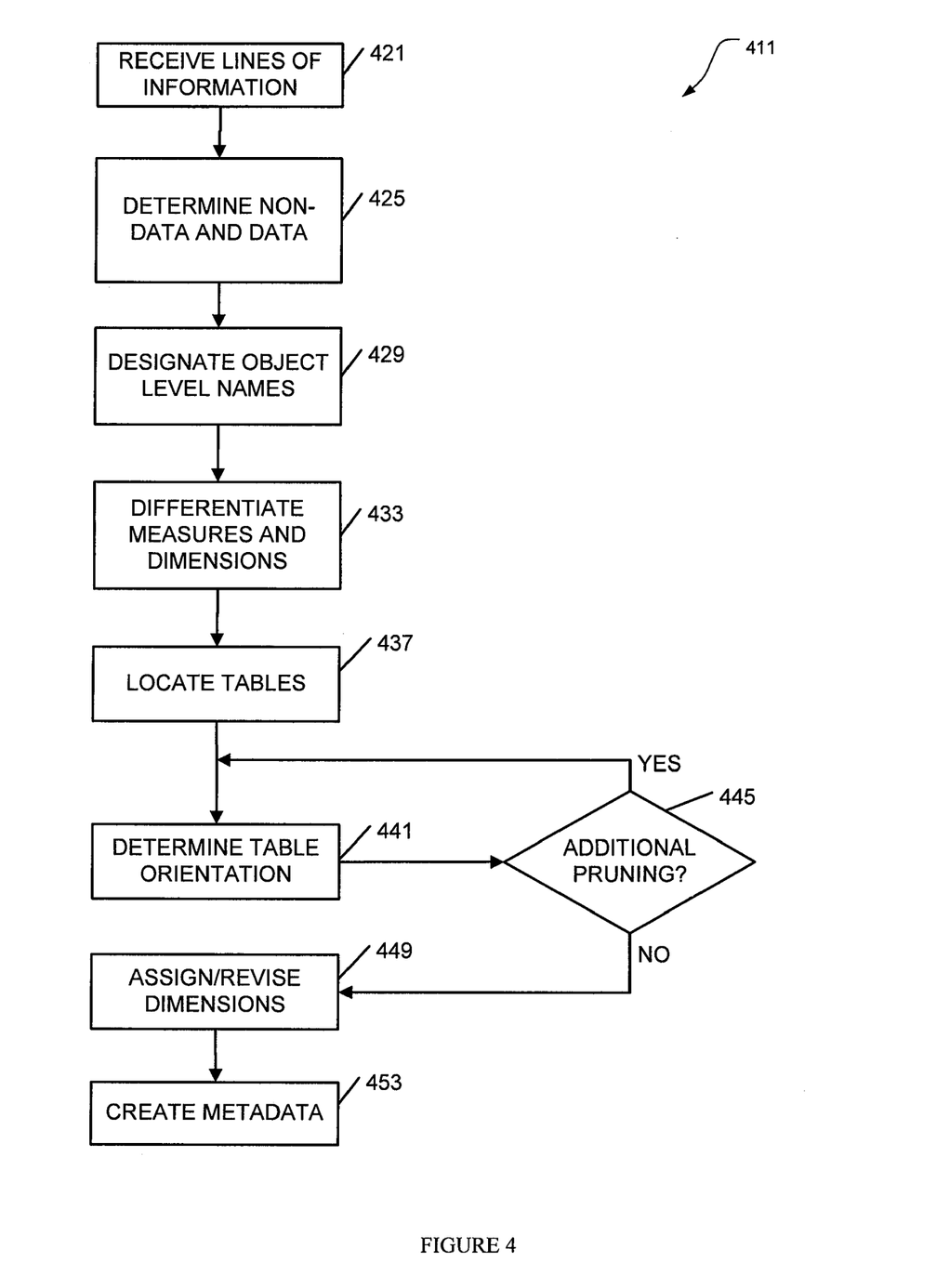
FIG. 4 is a flow diagram illustrating several computer-implemented methods according to various embodiments of the invention.

For example, FIG. 4 is a flow diagram illustrating several computer-implemented methods according to various embodiments of the invention. The methods 411 are implemented in a machine-accessible and readable medium and are operational over processes within and among networks. The networks may be wired, wireless, or a combination of wired and wireless. The methods 411 may be implemented as instructions, which when accessed by a specific machine, perform the processing depicted in FIG. 4.

The reader that desires to learn more about various activities that are included in the methods 411 is encouraged to consult the Appendix to this document. Here an algorithm comprising pseudo-code is set forth. The algorithm can be used to determine the orientation of a table (e.g., vertical or horizontal), whether a header comprising non-data rows/columns exists, and whether a set of data exists. It does not account for detecting the existence of one or more tables, or determining functional dependencies within the data. It should be noted that the presence of "//" characters indicate the beginning of a comment on the instructions in the algorithm, and are not part of the algorithm itself. The algorithm is applied to a small data file containing a limited number of elements in a single table. Since those of ordinary skill in the art will readily understand the instructions included in the algorithm, only some brief notes of explanation are included here.

The algorithm in the Appendix includes the function "Prune DecisionTree". This function operates by viewing the previous list of decision tree branches, and then pruning the branches based on the current line of information that has been received. For example, consider Table II, below.

TABLE II

| Customer | Bob          | Joe          |
|----------|--------------|--------------|
| City     | NY           | Paris        |
| Date     | Dec, 1, 2008 | Dec. 2, 2008 |
| Revenue  | $2,000.00    | $3,000.00    |

After reading the first line of information (i.e., Customer, Bob, Joe), the decision tree may have the following branches, each of which indicates a potential orientation of the table: horizontal with header, horizontal without header, vertical with header, and vertical without header.

After reading the second line of information (i.e., City, NY, Paris), the decision tree may have the following branches: horizontal with header, horizontal without header, vertical with header, and vertical without header. Nothing has changed yet, because not enough information has been received so that any one branch appears to be more likely than another.

However, after reading the third line of information (i.e., Date, 12/1/2008, 12/2/2008), a proposal to prune the decision tree down to the following branches may be set forth: horizontal with header. This is because the pattern of data in each line matches with this proposal, unlike the others. After reading the fourth line of information (i.e., Revenue, $2000.00, $3000.00), the decision tree proposal to prune down to the following branches is confirmed as: horizontal with header. Again, the pattern of data in each line matches with this proposal, unlike the others.

The algorithm in the Appendix also includes the function "Adapt element[x].type". This function operates by viewing the previous object data type that is proposed, and the type defined based on the most recent line of information (i.e., the current type). Thus, recently-received information can be used to modify the object data type, perhaps based on the following rules:

If the previous type is the same as current type; then do not change the previous type.
If the previous type is String; then do not change the previous type.
If the current type is String; then set the previous type to String.
If the previous type is Numeric and the current type is Date; then set the previous type to String.
If the previous type is Date and the current type is Numeric; then set the previous type to String.

Given this context, the creation of metadata from database files, and other types of files, will now be discussed with reference to FIG. 4.

In various embodiments, a processor-implemented method 411 of creating metadata, to execute on one or more processors that perform the method, may begin at block 421. The activity at block 421 may include receiving, sequentially, individual lines of information included in a file, such as a spreadsheet file, stored in an electronic storage medium.

Metadata can be created based at least on the arrangement of the data, as well as the determined orientation of the spreadsheet. Thus, the method 411 may continue on to block 425 with determining existence, within the individual lines of information and based on the arrangement of the data within and across the lines of information received, of header non-data and data that together comprise a data set.

The method 411 may operate to determine whether header non-data exists, and then to separate the headers from more generic data that make up a major portion of the information in a table. As part of this activity, header non-data information can be designated using object level names. Thus, the method 411 may continue on to block 429 with designating object level names as part of header non-data included in the information.

Data objects can be designated as measures or dimensions depending on their proximity to other data objects, or by their location (e.g., at the end of spreadsheet rows/columns). For example, a dimension in a left-hand column could be designated as a detail, which has a 1:1 relationship (two-way functional dependency) with another dimension. It should be noted that this relationship generally holds for spreadsheets created in the Western world. Other relationships may apply, based on a particular geographic location, industry usage, custom, etc. Thus, the method 411 may continue on to block 433 to include differentiating between measures and dimensions included in the object qualifications associated with a first group of data in the information by determining proximity of the first group to a second group of data in the information, or to the end of a table in the spreadsheet.

The method 411 may go on to include, at block 437, locating at least one table in the spreadsheet when at least two of the lines in a sequence are consecutive lines that begin with a non-empty cell and have a matching length. Several other factors may be included to help locate tables within a data file, such as the appearance of one or two empty columns adjacent to the end of a potentially-determined table.

Thus, once the orientation of one table is determined, the method 411 may operate so that multiple tables within the file can also be determined. For example, the activity at block 437 may include determining the existence of more than one table in the spreadsheet file by finding clusters of data in the information where at least two consecutive ones of the lines received have the same length, and where at least one or two blank columns are disposed between a first part of the information and a second part of the information.

The method 411 may continue on to block 441 to include determining a vertical or horizontal orientation of the table located in the spreadsheet, perhaps based on the arrangement of the information within the lines of information and across the lines of information, after one or more of the lines of information have been received.

A decision tree, with pruning, can be used to determine the orientation of the tables. Thus, the activity at block 441 may further include determining the vertical orientation or the horizontal orientation of one or more tables by pruning a decision tree having branches associated with proposals that are validated or pruned according to at least some of the lines of information that are received.

Branches in the decision tree can be updated to change the column data type as more lines in the file are received/read. Thus, the activity at block 441 may include updating at least one of the branches by changing a column data type.

If additional pruning is desired, such may be automatically accomplished via additional algorithmic activity, or manually, via end-user selection. In either case, a query with respect to additional pruning can be made at block 445. Thus, the activity at block 445 may include presenting an end-user with a query that results in performing additional decision tree pruning, perhaps by displaying a request to solicit pruning data indicating additional pruning of the tree. If more pruning is desired, it may be implemented as part of the activity at block 441. If no more pruning is desired, then the method 411 may continue on to block 449.

Table columns can be assigned a dimension as a default column type, which can be revised to other column types depending on the specific values of information found in the column (e.g., changing the dimension to a measure when currency designation is found, or to a detail when 1:1 (two-way) functional dependency is found, such as 1:1 relationship between a name and a social security number). Thus, the method 411 may continue on to block 449 with assigning a dimension as a default one of the object qualifications to table columns, and revising the dimension to a different one of the object qualifications based on data types of the information contained within the table columns.

The method 411 may continue on to block 453 with creating metadata from the information, based on the arrangement of the information within and across the lines that have been received, wherein the metadata comprises at least one of object label names, object qualifications, and/or object data types.

To summarize, in most embodiments of the invention, the data is read in from a file so that one or more tables can be located within the data. The orientation of the located tables is determined based on the arrangement of the data, and the metadata is then created. Thus, in some embodiments, the activity at block 453 includes creating the metadata based on the orientation of the table and the arrangement of the information, within and across the lines that have been received.

The created metadata may include functional dependencies that have been determined. A functional dependency can exist in hierarchical form, such as Country=>State=>City. Thus, the activity at block 453 may comprise creating the metadata to include determined functional dependencies within the information.

Object data types can be used as object label names where no names are found. Thus, the activity at block 453 may comprise selecting one of the object data types that has been found to use as one or more object label names.

The methods described herein do not have to be executed in the order described, or in any particular order. Moreover, various activities described with respect to the methods identified herein can be executed in repetitive, serial, or parallel fashion. The individual activities of the methods shown in FIG. 4 can also be combined with each other and/or substituted, one for another, in various ways. Information, including parameters, commands, operands, and other data, can be sent and received in the form of one or more carrier waves. Thus, many other embodiments may be realized.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, logic or managers, that operate to perform one or more operations or functions. The modules, logic, and managers referred to herein may, in some example embodiments, comprise processor-implemented modules, logic, or managers.

Similarly, the methods described herein may be at least partially processor-implemented. For example, at least some of the operations of any one method may be performed by one or more processors or processor-implemented modules. The performance of certain operations may be distributed among the one or more processors, not only residing within a single machine, but deployed across a number of machines. In some embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)). Many embodiments may thus be realized.

Figure 5:
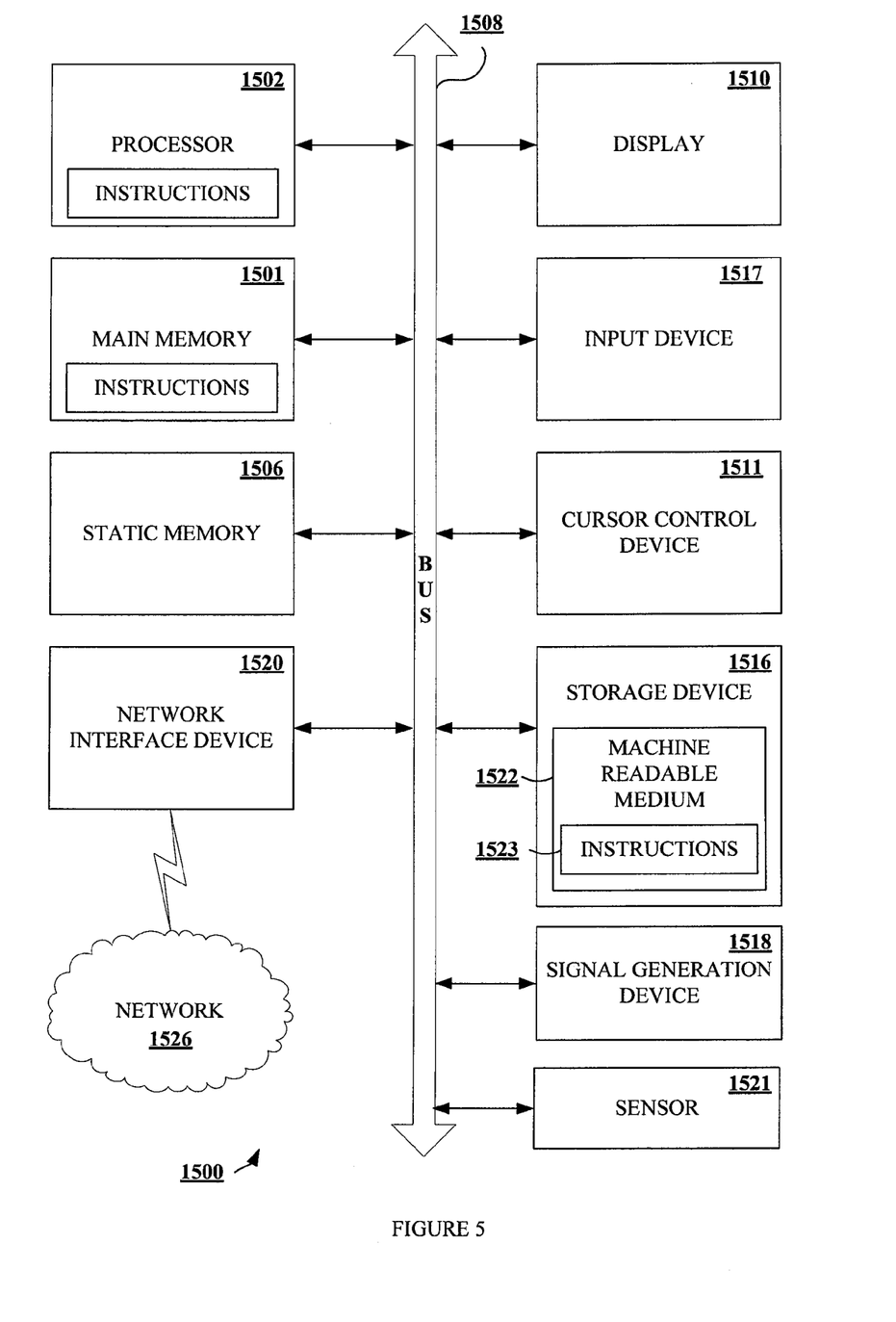
FIG. 5 is a block diagram of an article of manufacture, in the form of a specific machine, according to various embodiments of the invention.

For example, FIG. 5 is a block diagram of an article of manufacture, including a specific machine, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand that various programming languages may be employed to create one or more software programs designed to implement and perform the methods and algorithms disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture, such as a computer, a memory system, a magnetic or optical disk, some other storage device, and/or any type of electronic device or system may include one or more processors 1502 coupled to a machine-readable medium 1522 such as a memory (e.g., removable storage media, as well as any memory including an electrical, optical, or electromagnetic conductor) having instructions 1523 stored thereon (e.g., computer program instructions), which when executed by the one or more processors 1502 result in the machine performing any of the actions described with respect to the methods above. In some embodiments, the article of manufacture comprises a tangible medium 1522, such as a CD-ROM or other non-volatile memory, to store the instructions 1523.

In some embodiments, a computer system 1500 may operate as a specific machine that includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device form part of a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The computer system 1500 may comprise a specific machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In some embodiments, the machine comprises any one of a server, a personal computer (PC), a tablet PC, a set-top box (STB), a PDA, a mobile telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The system 1500 may be similar to or identical to the apparatus 300 or system 310 of FIG. 3.

Returning to FIG. 5, it can be seen that the drive unit 1516 includes a machine-readable medium 1522 on which is stored one or more sets of instructions and data structures (e.g., instructions 1523) embodying or utilized by any one or more of the methodologies or functions described herein. The instructions 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Implementing the apparatus, systems, and methods described herein may operate to render the processing of large data files more efficiently, providing higher performance and a simplified desktop experience. More efficient allocation of processing resources, and increased user satisfaction, may also result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Appendix

// The algorithm that follows is one of many that may be implemented as part of some of the
// embodiments described herein. It should be noted that portions of spreadsheets are shown
// below that are not meant to be assembled into a single, integrated whole. Rather, to assist
// in understanding the information processing illustrated herein, these spreadsheet portions
// have been constructed to illustrate a wide variety of arrangements for the data shown,
// including changes in orientation and content type.

```
>>> START ALGORITHM
Element = {value; type}      //An element is based on a value and a type
TableResult = {Direction; header [TableResult.length];Type[type];Table[max(length_x,
    length_y) of Element]}      //Result is a direction; headers, all the elements are a
    list of type and a table of element
// treat the first line to set the decision tree
Read all Elements for the first line
If element[0..n]. type change then    //check that the type of the line is changing
    If (element[0]. type == character) && (element[1..n]. type don't change)
        //Store Decision #1
        Revenue         2000        2000
        TableResult .Direction=Horizontal
```

```
            TableResult .header [0] = element[0].value
            TableResult .Type[0] = element[1].type
            Store element[1..n]. value in TableResult.Table
            // Store Decision #2
       Bob          NY          SAP
            TableResult .Direction= Vertical
            TableResult .header [0] = null              //no header
            TableResult .Type[0..n] = element[1].type
            Store element[0..n]. value in TableResult.Table
        Else If (element[0]. Type != character) && (element[1..n]. Type don't change)
            // Store Decision #1
         3000         Bob          SAP
            TableResult .Direction= Vertical
            TableResult .Header[0..n] = null            //no header
            TableResult .Type[0..n] = element[0..n] .type
            Store element[0..n]. value in TableResult.Table
        Else If (element[0]. Type== character) && (element[1..n]. Type change)
            // Store Decision #1
         Joe          Bob         4000
            TableResult .Direction= Vertical
            TableResult .Header[0..n] = null            //no header
            TableResult .Type[0..n] = element[0..n] .type
            Store element[0..n]. value in TableResult.Table
        Else If (element[0]. Type != character) && (element[1..n]. Type change)
            // Store Decision #1
          2000        Bob         4000
            TableResult .Direction= Vertical
            TableResult .Header[0..n] = null            //no header
            TableResult .Type[0..n] = element[0..n] .type
            Store element[0..n]. value in TableResult.Table
        End If
    Else If (element[0..n]. type don't change)
        If Type[0] is not a character
            // Store Decision #1
            2000         3000        4000
            TableResult .Direction= Horizontal
            TableResult .Type[0] = element[0] .type
            TableResult .Header[0] = null               //no header
            Store element[0..n]. value in TableResult.Table
            // Store Decision #2
            2000         3000        4000
            TableResult .Direction= Vertical
            TableResult .Type[0..n] = element[0..n] .type
            TableResult .Header[0] = null               //no header
            Store element[0..n]. value in TableResult.Table
        Else If Type[0] is a character
            // Store Decision #1
            Customer         Bob        Joe
            TableResult .Direction= Horizontal
            TableResult .Type[0] = element[0] .type
            TableResult .Header[0] = element[0].value
            Store element[1..n]. value in TableResult.Table
        OR
            // Store Decision #2
            Customer        Company     Revenue
            TableResult .Direction= Vertical
            TableResult .Type[0..n] = null
            TableResult .Header[0..n] = element[0..n].value
            //Not storing in TableResult.Table since full header
        OR
            // Store Decision #3
            Bob            SAP        Intel
            TableResult .Direction= Horizontal
            TableResult .Type[0] = element[0] .type
            TableResult .Header[0] = null               //no header
            Store element[0..n]. value in TableResult.Table
        OR
            // Store Decision #4
            Bob            SAP        Intel
            TableResult .Direction= Vertical
            TableResult .Type[0..n] = element[0..n] .type
            TableResult .Header[0] = null               //no header
            Store element[0..n]. value in TableResult.Table
        End If
    End If
For(I = 2; I<N; i++)
    Read all Element for line(i)
//For the Line 2, check the number of items, if this is in the same as the previous line so
it is a
//TableResult, otherwise flush the previous table result and leave the for and start the
```

```
algorithm with
// second line is first line
    If element[0..n]. type change then
        If (element[0]. type == character) && (element[1..n]. type don't change)
            Prune DecisionTree with
                //Decision #1
            Company          2000        2000
                TableResult .Direction= Horizontal
                TableResult .Header[i] = element[0].value
                TableResult .Type[i] = Adapt element[1..n] .type
                Store element[1..n]. value in TableResult.Table
        else If (element[0]. type == character) && (element[1..n]. Type change)
            Prune DecisionTree with
                //Decision #1
            Bob              SAP         2000
                TableResult .Direction= Vertical
                //Support both decision with header and no header
                TableResult .Type[i] = Adapt Type[0..n] with element[0..n]
    .type
                Store element[0..n]. value in TableResult.Table
        else If (element[0]. Type != character) && (element[1..n]. Type change)
            Prune DecisionTree with
                //Decision #1
              2000           SAP         3000
                TableResult .Direction= Vertical
                //Support both decision with header and no header
                TableResult .Type[0..n] = Adapt Type[0..n] with element[0..n]
    .type
                Store element[0..n]. value in TableResult.Table
        else If (element[0]. Type != character) && (element[1..n]. Type not
change)
            Prune DecisionTree with
                //Decision #1
              2000           SAP         Intel
                TableResult .Direction= Vertical
                //Support both decision with header and no header
                TableResult .Type[0..n] = Adapt Type[0..n] with element[0..n]
    .type
                Store element[0..n]. value in TableResult.Table
        EndIf
Else If element[0..n]. type don't change then
    If Type[0] is not a character
        Prune DecisionTree with
            //Decision #1
            2000            3000        4000
            TableResult .Direction= Horizontal
            TableResult .Header[0..n] = null
            TableResult .Type[i] = Adapt element[0] .type
            Store element[0..n]. value in TableResult.Table
        OR
            //Decision #2
             2000           3000        4000
            TableResult .Direction= Vertical
            //Support both decision with header and no header
            TableResult .Type[0..n] = Adapt element[0..n] .type
            Store element[0..n]. value in TableResult.Table
    ElseIf Type[0] is a character
        Prune DecisionTree with
            //Decision #1
            City            Paris       New York
            TableResult .Direction= Horizontal
            TableResult .Header[i] = element[0].value
            TableResult .Type[i] = Adapt element[1] .type
            Store element[1..n]. value in TableResult.Table
        OR
            //Decision #2
            NY              Paris       New York
            TableResult .Direction= Horizontal
            TableResult .Header[0..n] = null            //no header
            TableResult .Type[i] = Adapt element[1] .type
            Store element[0..n]. value in TableResult.Table
        OR
            //Decision #3
             NY             Paris       New York
            TableResult .Direction= Vertical
            //Support both decision with header and no header
            TableResult .Type[0..n] = Adapt element[0..n] .type
            Store element[0..n]. value in TableResult.Table
```

```
        EndIf
End If
End For
>>> END ALGORITHM
```

What is claimed is:

1. An apparatus, comprising:
a processing node comprising a data reception module to sequentially receive individual lines of information from a spreadsheet tile stored in an electronic storage medium; and
an analysis module implemented by one or more processors to couple to the processing node, the analysis module to locate at least one table in the spreadsheet when at least two of the lines in a sequence have a matching length, to determine, based on an arrangement of the information within the lines and across the lines, an orientation of the at least one table, and to create metadata from the information based on the arrangement, the metadata comprising object label names, object qualifications, and object data types.

2. The apparatus of claim 1, further comprising:
a display to display rows and columns of the spreadsheet file according to the orientation of the at least one table and locations of data within the information, the data associated with the object data types.

3. The apparatus of claim 1, further comprising:
multiple processors, wherein the processing node comprises a first one of the multiple processors, and wherein the analysis module comprises a software module to be executed by a second one of the multiple processors.

4. The apparatus of claim 1, wherein the processing node comprises one of a server or a client.

5. A system, comprising:
a first processing node comprising a data reception module to sequentially receive individual lines of information from a spreadsheet file stored in an electronic storage medium; and
a second processing node comprising an analysis module implemented by one or more processors to couple to the first processing node, the analysis module to locate at least one table in the spreadsheet when at least two of the lines in a sequence have a matching length, to determine, based on an arrangement of the information within the lines and across the lines, an orientation. of the at least one table, and to create metadata from the information based on the arrangement, the metadata comprising object label names, object qualifications, and object data types.

6. The system of claim 5, wherein the first processing node comprises a client node, and wherein the second processing node comprises a server node.

7. The system of claim 5, further comprising:
a. display coupled to one of the first processing node or the second processing node, the display to display a query to solicit selection of orientation data indicating whether the determined orientation is correct, 8. A processor-implemented method to execute on one or more processors that perform the method, comprising:
receiving, sequentially, individual lines of information included in a spreadsheet file stored in an electronic storage medium;
locating at least one table in the spreadsheet when at least two of the lines in a sequence are consecutive lines that begin with a n.on-empty cell and have a matching length;
determining a vertical orientation or a horizontal orientation of the at least one table in the spreadsheet based on an arrangement of the information within the lines and across the lines; and
creating metadata from the information, based on the arrangement, the metadata comprising object label names, object qualifications, and object data types.

9. The method of claim 8, wherein the creating further comprises:
creating the metadata based on the orientation and the arrangement.

10. The method of claim 8, further comprising:
determining existence, within the information and based on the arrangement, of header non-data and data comprising a data set.

11. The method of claim 8, further comprising:
designating the object level names as part of header non-data included in the information.

12. The method of claim 8, wherein the determining further comprises:
determining the vertical orientation or the horizontal orientation by pruning a decision tree having branches associated with proposals that are validated or pruned according to at least some of the lines that are received.

13. The method of claim 12, wherein the pruning further comprises:
updating at least one of the branches by changing a column data type.

14. The method of claim 8, wherein the locating further comprises:
determining existence of more than the at least one table in the spreadsheet file by finding clusters of data in the information where at least two consecutive ones of the lines have the same length, and where at least two blank columns are disposed between a first part of the information and a second part of the information.

15. The method of claim 8, wherein the creating metadata further comprises:
creating the metadata to include determined functional dependencies within the information.

16. The method of claim 8, further comprising:
displaying a request to solicit pruning data indicating additional pruning of the tree.

17. The method of claim 8, wherein the creating metadata further comprises:
selecting one of the object data types to use as one of the object label names.

18. An article comprising a tangible computer-readable storage medium containing executable instructions stored thereon which, when executed, result in a processor performing:
receiving, sequentially, individual lines of information included in a spreadsheet file stored in an electronic storage medium;

locating at least one table in the spreadsheet when at least two of the lines in a sequence have a matching length;

determining a vertical orientation or a horizontal orientation of the at least one table in the spreadsheet based on an arrangement of the information within the lines and across the lines; and creating metadata from the information, based on the arrangement, the metadata comprising object label names, object qualifications, and object data types.

19. The article of claim 18, containing executable instructions stored thereon which, when executed, result in the processor performing:

assigning a dimension as a default one of the object qualifications to table columns; and revising the dimension to a different one of the object qualifications based on data types of the information contained within the table columns.

20. The article of claim 18, containing executable instructions ored thereon which, when executed, result in the processor performing:

differentiating between measures and dimensions included in the object qualifications associated with a first group of data in the information by determining proximity of the first group to a second group of data in the information or to an end of a table in the spreadsheet.

* * * * *